Nov. 27, 1923.  
R. ALLEN  
1,475,773  
PISTON  
Original Filed May 26, 1920    3 Sheets-Sheet 1
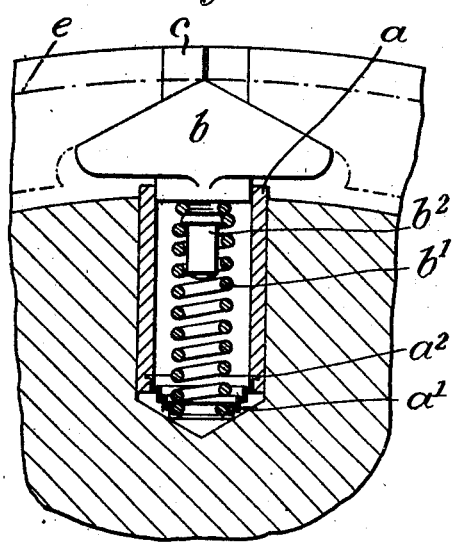
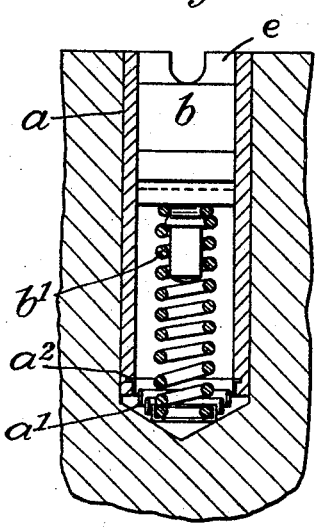
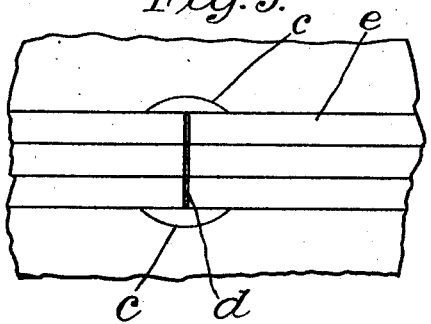
Inventor  
Robert Allen Inventor
Robert Allen Nov. 27, 1923.  
R. ALLEN  
PISTON  
1,475,773
Original Filed May 26, 1920   3 Sheets-Sheet 3
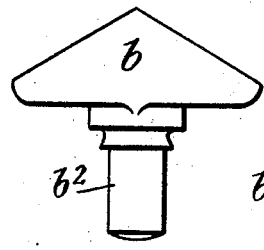
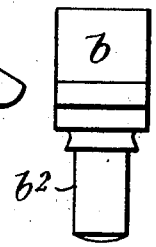
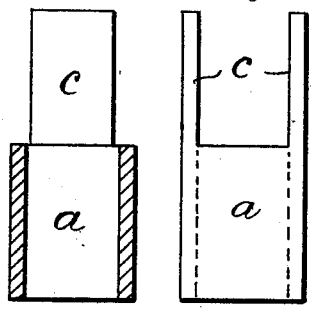
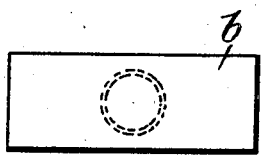
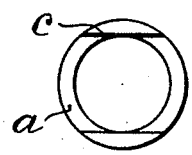
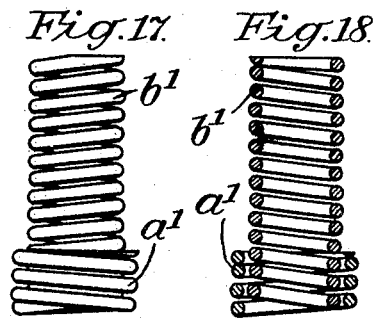
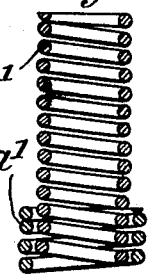
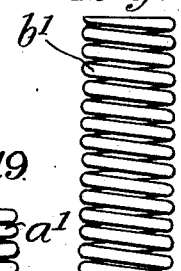
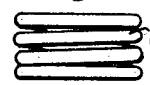
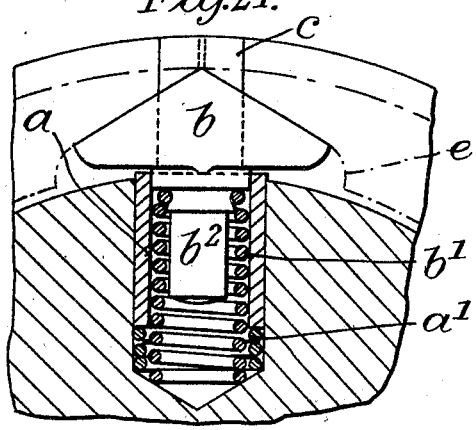
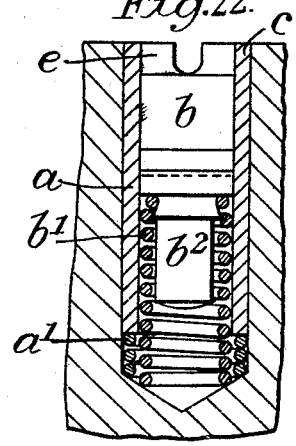
Inventor  
Robert Allen  
By H. B. Willson & Co.  
Attorneys Patented Nov. 27, 1923.

1,475,773

UNITED STATES PATENT OFFICE.

ROBERT ALLEN, OF WOODCOTE, READING, ENGLAND.

PISTON.

Application filed May 26, 1920, Serial No. 384,495. Renewed June 26, 1923.

*To all whom it may concern:*

Be it known that I, ROBERT ALLEN, of Chiltern Rise, Woodcote, Reading, in the county of Berkshire, England, a subject of the King of Great Britain and Ireland (whose post-office address is Chiltern Rise, Woodcote, Reading, in the county of Berkshire, England), have invented certain new and useful Improvements in Pistons, of which the following is a specification.

The type of piston packing to which my invention is applicable comprises a packing ring having one or more joints each closed by a sliding plug (hereinafter referred to as the sealing member) associated with a wedge or choke piece (hereinafter referred to as the expanding member) and one object of the invention is to permit of or promote the free radial sliding of the sealing member independently of the expanding member in order to render the sealing effective notwithstanding variations in the cylinder diameter.

Another object of the invention is to provide a novel construction in which the expanding member, the sealing member, and the operating springs for both members, are all connected to form a single unit for ease in commercial handling before installation without danger of any part becoming lost.

In the accompanying drawings:

Figure 1 to Figure 3 are sectional elevations at right angles and plan respectively illustrating a portion of a piston with packing ring joint sealing and expanding members constructed according to this invention.

Figures 11 to 13 are detail views of an expanding member.

Figures 14 to 16 are detail views of a sealing member for use with the same.

Figures 17 to 20 are detail views of suitable springs for expanding the two members.

Figures 21 and 22 are similar views to Figures 1 and 2 illustrating the assembling of similar details to those shown in Figures 11 to 20.

As shown in Figures 1 to 3 the sealing member $a$ which is fitted in a radial bore in the body of the piston consists of a tube or sleeve slotted to receive the expanding member or choke $b$ and leaving segments $c$ at the outer end which extend radially across the joint $d$ in the piston ring or rings $e$. The sealing member $a$ is forced outwards by an involute spiral spring $a'$ and the expanding member $b$ is forced outwards by an independent helical spring $b'$. Spring $b'$ is attached to the stem $b^2$ of the expanding member $b$ by causing the first convolution of the spring to grip in a groove or undercut portion of the stem, whilst the spring $a'$ is shaped to grip the opposite end coil of the spring $b'$ and also to engage by means of a flange $a^2$ with an annular groove or notch in the inner end of the sealing member.

By connecting the parts as described they can remain assembled while in stores or when dismantling for examination and there is no likelihood of any part being lost.

Figure 4:
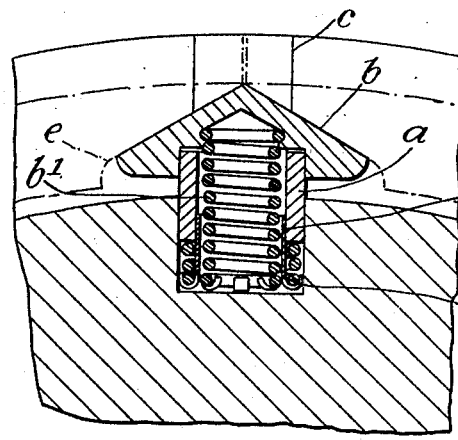
Figures 4 to 6 are similar views to Figures 1 to 3 showing a modified form of construction.
Figure 5:
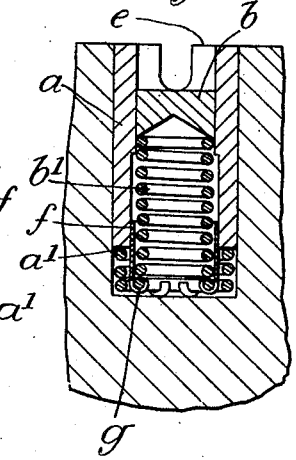
Figure 6:
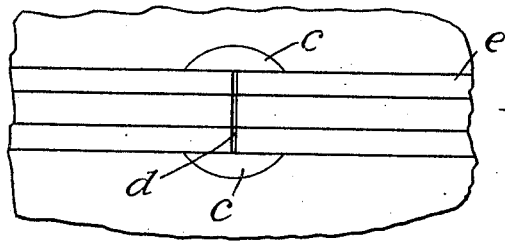
Figure 7:
Figures 7 to 10 are detail views of a sleeve employed for connecting the springs shown in Figures 4 to 6.
Figure 9:
Figure 8:
Figure 10:
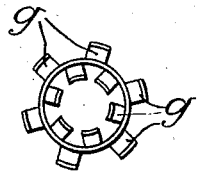

In the modified form of construction shown in Figures 4 to 10 the spring $b'$ is attached at its outer end to the expanding member $b$ by springing its end coils into an undercut recess in the member $b$ no stem being provided in this case on said member. A helical spring $a'$ is employed for forcing the sealing member $a$ outwardly and is connected to the spring $b'$ by a tubular sleeve $f$ slit as shown in Figures 7 and 8 to form tongues $g$ which are bent outwards and inwards alternately as shown in Figures 9 to 10 and clipped over the adjacent inner end coils of the two springs $a'$ $b'$ as clearly illustrated in Figures 4 and 5. Sleeve $f$ also serves to separate the coils of the two springs so that they do not interfere with one another and may be wound either in the same or opposite directions. The outer spring may also be of a different strength to the inner spring.

The detail views Figures 11 to 16 show clearly the construction of an expanding member $b$ with stem $b^2$ grooved for the attachment of the spring $b'$ and a sealing member $a$ with its joint closing segments $c$.

In Figures 17 and 18 is shown a method of forming both the springs $a'$ $b'$ from the same wire, the outer spring $a'$ being wound the reverse way to the inner spring to prevent the inner and outer coils engaging with each other.

This construction prevents the springs being separated and the separate coupling piece is not required as in the case where separate springs are employed. The various elements included in Figures 11 to 18 are assembled in the manner illustrated in Figures 21 and 22.

From the foregoing description it will be seen that the sealing and expanding members *a b* can be moved radially outwards by springs independently of each other thus ensuring the proper expansion of the packing and sealing of the joint irrespective of whatever variations may occur in the cylinder diameter, and regardless of differences in the amount of wear on the two members.

With this invention it is also possible to close and keep closed the joints of single cut rings although the variations at the joint due to cylinder variations are much greater than in the case of segmental rings where the displacements due to cylinder variations are distributed over more than one joint.

I claim:—

1. The combination with a jointed packing ring, of independent expanding and sealing members for the joint of said ring, and independent means for forcing said expanding and sealing members toward the cylinder wall.

2. The combination with a jointed packing ring, of independent expanding and sealing members for the joint of said ring capable of independent movement radially of the piston, and springs arranged to operate said members independently of each other and move them toward the cylinder wall.

3. The combination with a packing ring for pistons, of a wedge-shaped expanding member or choke fitting in the joint of the ring, a tubular sealing member slotted to receive the wedge and to provide segments extending radially across the joint, and springs arranged to effect the independent operation of the said members.

4. A piston ring expander and joint seal comprising expanding and sealing members for the ring joint capable of independent movement radially of the piston, and connected springs for operating said members and for preventing separation thereof prior to installation.

5. A piston ring expander and joint seal comprising a ring expanding member adapted to fit in the ring joint, a tubular sealing member slotted at its outer end to receive said expanding member and to provide segments to extend over the joint of the ring, and inner and outer springs connected to each other and engaging said expanding member and said sealing member respectively to move them radially of the piston, said inner spring being connected to said expanding member, whereby both members and springs are held against separation prior to installation.

In testimony whereof he has affixed his signature.

ROBERT ALLEN.